(12) United States Patent  
Ko et al.

(10) Patent No.: US 9,874,754 B2  
(45) Date of Patent: Jan. 23, 2018

(54) GLASSES-TYPE TERMINAL

(71) Applicant: LG ELECTRONICS INC., Seoul (KR)

(72) Inventors: Dongseuck Ko, Seoul (KR); Dongchoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 14/790,679

(22) Filed: Jul. 2, 2015

(65) Prior Publication Data

US 2016/0004086 A1 Jan. 7, 2016

(30) Foreign Application Priority Data

Jul. 2, 2014 (KR) .................. 10-2014-0082632

(51) Int. Cl.
G09G 5/00 (2006.01)
G02B 27/01 (2006.01)
G02C 11/00 (2006.01)
G02C 5/20 (2006.01)

(52) U.S. Cl.
CPC .. *G02B 27/0176* (2013.01); *G02B 2027/0138* (2013.01); *G02C 5/20* (2013.01); *G02C 11/10* (2013.01); *G02C 2200/02* (2013.01)

(58) Field of Classification Search
None
See application file for complete search history.

(56) References Cited

U.S. PATENT DOCUMENTS

| 5,774,096 | A  | * | 6/1998 | Usuki | G02B 7/12 340/980 |
| 2005/0248719 | A1 | * | 11/2005 | Howell | G02C 5/001 351/41 |
| 2006/0119539 | A1 | * | 6/2006 | Kato | G02B 27/0176 345/8 |
| 2008/0291277 | A1 | * | 11/2008 | Jacobsen | G02B 27/0172 348/158 |
| 2009/0067138 | A1 | * | 3/2009 | Oliver | G06F 1/1624 361/730 |
| 2014/0232980 | A1 | * | 8/2014 | Harms | G02C 11/00 351/158 |

* cited by examiner

*Primary Examiner* — Christopher R Lamb
(74) *Attorney, Agent, or Firm* — KED & Associates, LLP

(57) ABSTRACT

Provided is a glasses-type terminal including: a frame that is supported on a user's head, having both ends separated from each other as a front part therein is cut-out; a power supply unit that is connected to one end of the frame; a control module that is connected to the other end of the frame, and having therein various electronic components that drive the glasses-type terminal; and a display unit that is provided on one end of the control module and that provides visual information, in which a rail is formed on an upper surface of the control module, and the rail is formed to be connected to a lower surface of the frame in a concavo-convex manner so that the control module slidably moves on the frame.

15 Claims, 14 Drawing Sheets

GLASSES-TYPE TERMINAL

CROSS-REFERENCE TO RELATED APPLICATION(S)

Pursuant to 35 U.S.C. §119(a), this application claims the benefit of earlier filing date and right of priority to Korean Application No. 10-2014-0082632, filed on Jul. 2, 2014, the contents of which are incorporated by reference herein in its entirety.

BACKGROUND

1. Field

The present disclosure relates to a glasses-type terminal capable of adjusting a size of a frame in such a manner that the glasses-type terminal fits a shape of a user' head.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

In recent years, a mobile terminal has evolved into a wearable device that is wearable on a user's body, as well as being held with his/her hand. One example of the wearable device is a glasses-type terminal.

A recent trend has been towards the development of a small-sized, lightweight glasses-type terminal. This makes it difficult to electrically connect the left and right sides of a frame of the glasses-type terminal to each other. Thus, electronic components are arranged in either of the left and right sides of the frame. This one side arrangement causes an unbalance in weight between the left and right sides of the frame. Furthermore, for design purpose, a battery is built into the frame, and this requires frequent charging of the battery.

In addition, the frames of the same size are provided without considering different shapes of user's heads. Thus, when a glasses-type terminal of this type is worn, there occur problems such as the difficulty in focusing images.

SUMMARY OF THE DISCLOSURE

Therefore, an aspect of the detailed description is to provide a glasses-type terminal in which left and right sides of a frame are electrically connected to each other with a balance in weight being maintained between the left and right sides.

Another object of the present invention is to provide a glasses-type terminal in which a portion of a frame that comes into contact with a user's head is adjustable.

A further object of the present invention is to provide a glasses-type terminal in which a position of a display unit is changed for user's convenience.

To achieve these and other advantages and in accordance with the purpose of this specification, as embodied and broadly described herein, there is provided a glasses-type terminal including: a frame that is supported on a user's head, having both ends separated from each other as a front part therein is cut-out; a power supply unit that is connected to one end of the frame; a control module that is connected to the other end of the frame, and having therein various electronic components that drive the glasses-type terminal; and a display unit that is provided on one end of the control module and that provides visual information, in which a rail is formed on an upper surface of the control module, and the rail is formed to be connected to a lower surface of the frame in a concavo-convex manner so that the control module slidably moves on the frame.

In the glass-type terminal, the rail may include a head that is formed to protrude toward the frame and that is inserted into a space in the frame, and a base that is connected to an upper surface of the control module.

In the glass-type terminal, protrusions that protrude toward each other from a lower surface of the frame may form an entrance to the space in the frame.

In the glasses-type terminal, the power supply unit may be connected to the lower surface of the frame, and the frame and the power supply unit may be connected to each other in a rail connection manner.

In the glasses-type terminal, a hook may be formed on a surface of the power supply unit, the surface may face the frame, and the hook may connect the power supply unit to the lower surface of the frame.

In the glasses-type terminal, sliding prevention members are provided on an inner circumferential surface of the frame.

In the glasses-type terminal, the sliding prevention members may be in a pair, and electrodes may be formed on the sliding prevention members 250, respectively, such that the user's head is recognized.

In the glasses-type terminal, the electrodes may face each other.

In the glasses-type terminal, a magnet may be provided on a lower surface of an end portion of the frame, and a Hall sensor (Hall IC) may be arranged on a front end portion of the control module.

In the glasses-type terminal, a hinge portion and a circuit drive unit may be arranged between the control module and the display unit, and the hinge portion and the circuit drive unit may be connected to each other by a hinge shaft.

In the glasses-type terminal, a flexible printed circuit board may be provided within the frame, and a fold space portion in which the flexible printed circuit board is mounted when the control module moves in a sliding manner may be provided on an end of the control module.

In the glasses-type terminal, the flexible printed circuit board may be formed in a vertical direction within the frame and may be formed in a horizontal direction near the fold space portion, and the flexible printed circuit board may be folded one or more times in the fold space portion.

In The glasses-type terminal, the flexible printed circuit board may be formed in a vertical direction within the frame and is folded one or more times in a vertical position in the fold space portion.

In the glasses-type terminal, the bases may be provided in at least two in number, and a fixing unit may be formed to protrude from an inner circumferential surface of the control module and to be inserted between the bases.

In the glasses-type terminal, the rail for the rail connection may be formed on a lower horizontal surface or an internal vertical surface of the frame, and the power supply unit may have a rail connection structure corresponding to the rail.

In the glasses-type terminal, the frame may include a first portion that comes into contact with a rear side of the user's head, a second portion that is connected to the first portion 210a, and to which the control module is coupled, and a third portion that that is connected to the first portion and to which the power supply unit is coupled, in which the first portion and the second portion may be separated from each other, and the first portion and the third portion may be separated from each other, and in which the second portion and the third portion may be exchangeable with each other.

In the glasses-type terminal, the first portion may be connected to the second portion and the third portion by a connector and a socket.

In the glasses-type terminal, wherein a socket may be inward formed at one side of the first portion and a connector may be outward formed at another side of the first portion, and a connector may be formed at the second portion and the third portion to correspond to the socket in the first portion, and a socket may be formed at the second portion and the third portion to correspond to the connector of the first portion.

In the glasses-type terminal, a camera may be provided on one end of the third portion.

Effects of the glasses-type terminal according to the present invention are as follows.

According to at least one of the embodiments of the present invention, a hair band type terminal is provided in which real scenes that lie in user's field of vision can be viewed without suffering from a limited viewing angle. According to at least one of the embodiments of the present invention, a portion of the frame of the glasses-type terminal is extendable and retractable that comes into contact with the user's head. Thus, it is easy to adjust a focal distance and it is possible to maintain a balance in weight between left and right sides of the frame by arranging the power supply unit and the control module in the left and right sides, respectively.

In addition, the power supply unit can be removably attached, and thus a high-capacity battery can be used. The usage time of the glasses-type terminal 200 is lengthened.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

Embodiments will be described in detail with reference to the following drawings in which like reference numerals refer to like elements and wherein:

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram for describing a mobile terminal according to the present invention;

FIG. 2 is a perspective diagram illustrating one example of a glasses-type terminal according to one embodiment of the present invention;

FIGS. 3A and 3B are cross-sectional diagrams illustrating that a frame and a rail according to one embodiment of the present invention are connected to each other;

Figure 4:
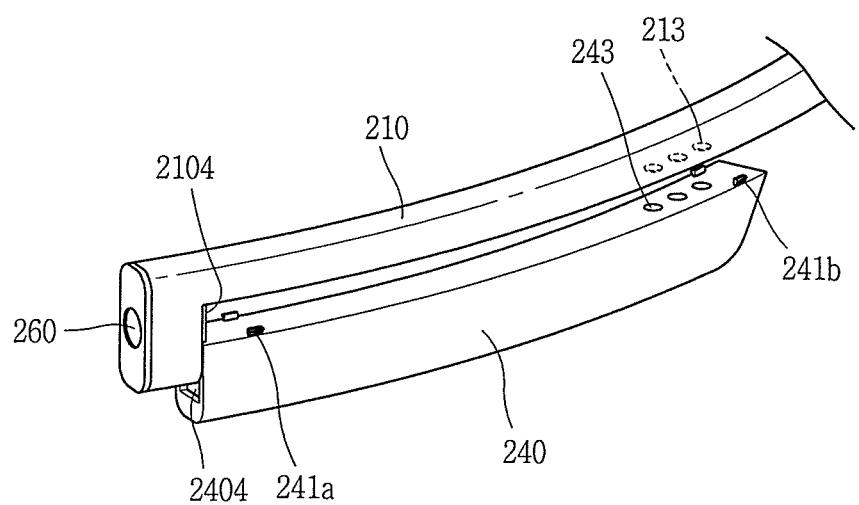
Figure 5A:
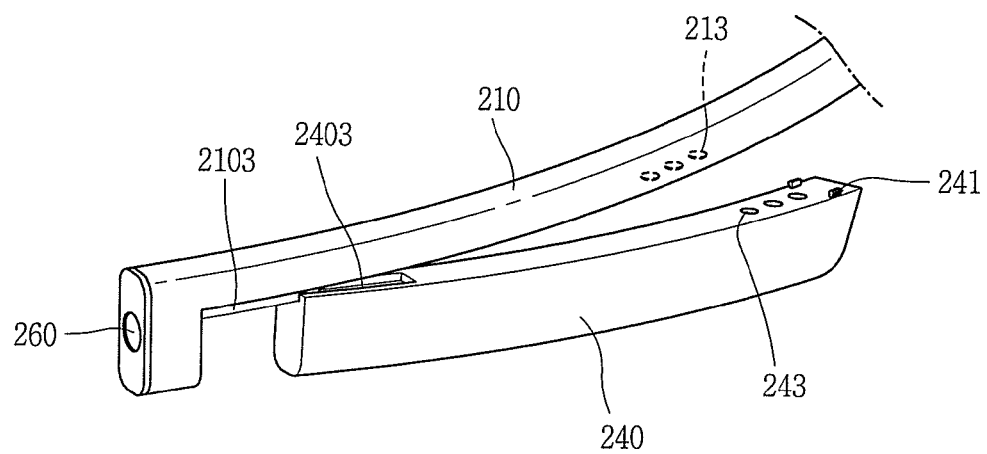
Figure 5B:
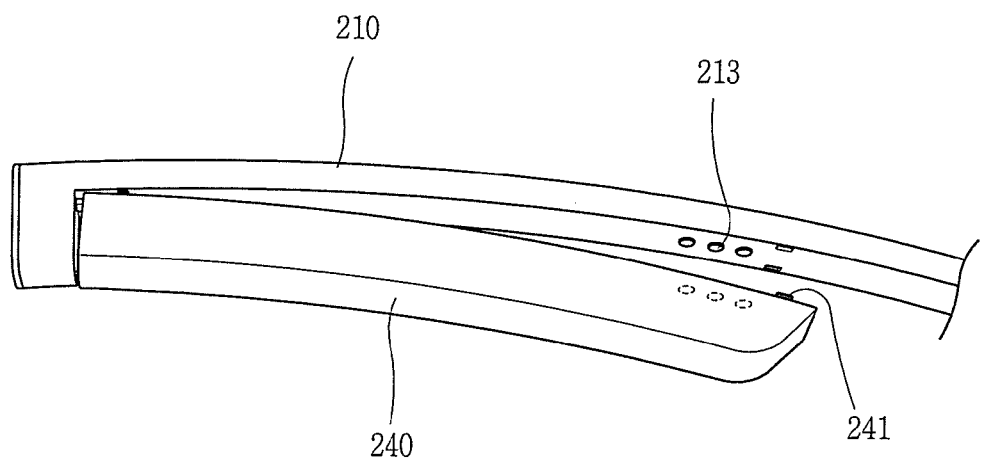
Figure 6:
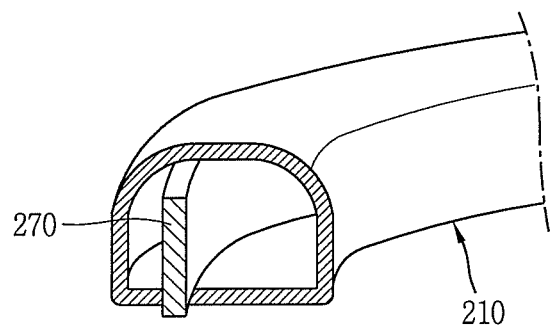
Figure 7:
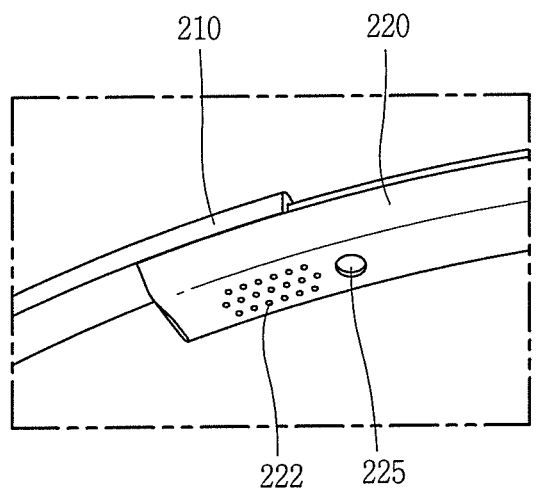
Figure 8A:
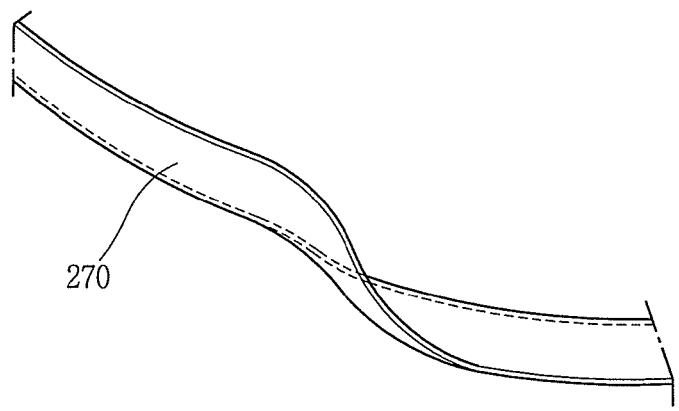
Figure 8B:
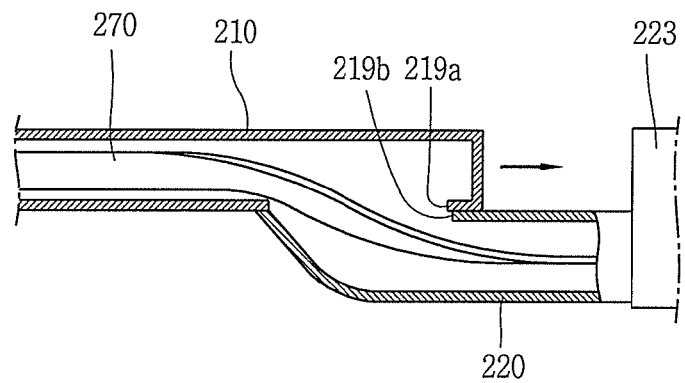
Figure 8C:
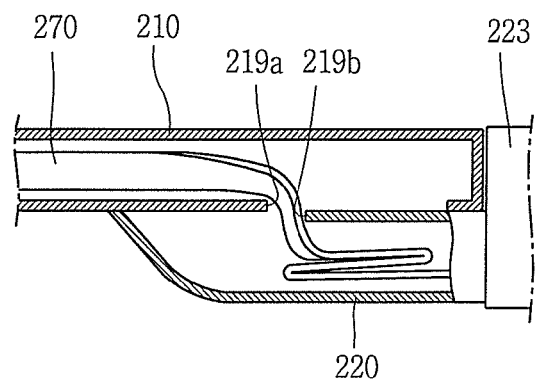
Figure 9:
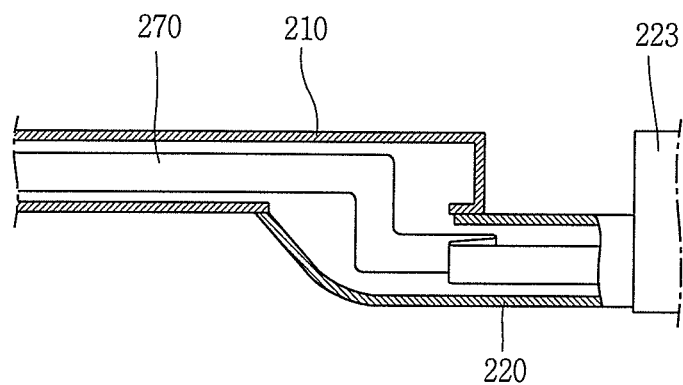
Figure 10:
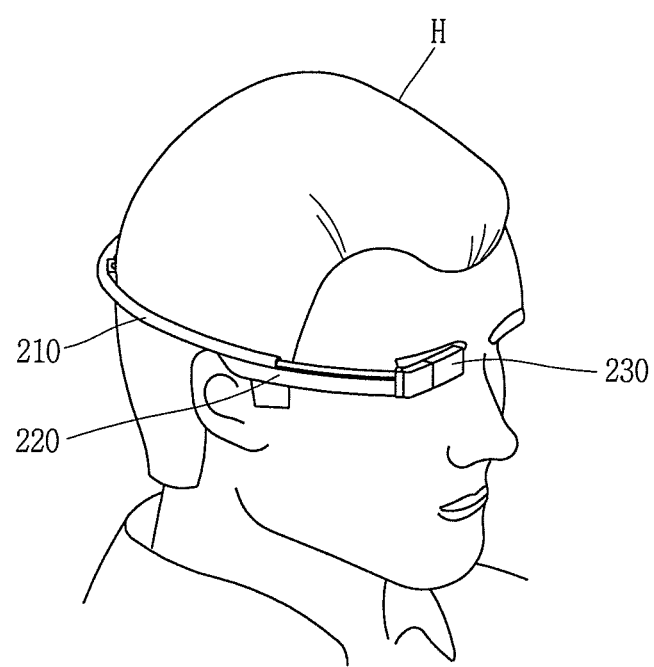
Figure 11A:
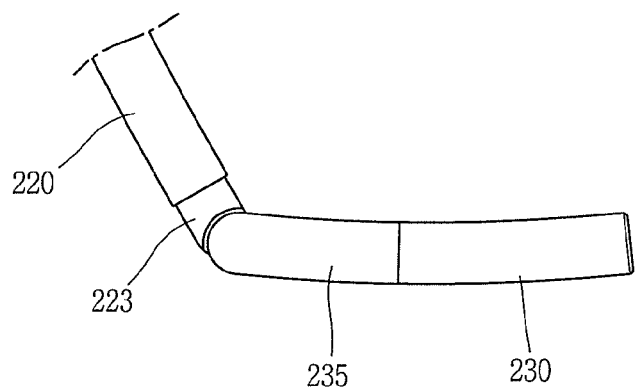
Figure 11B:
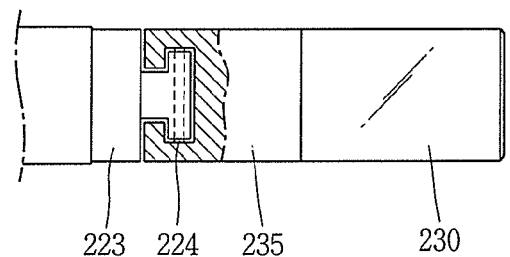
Figure 11C:
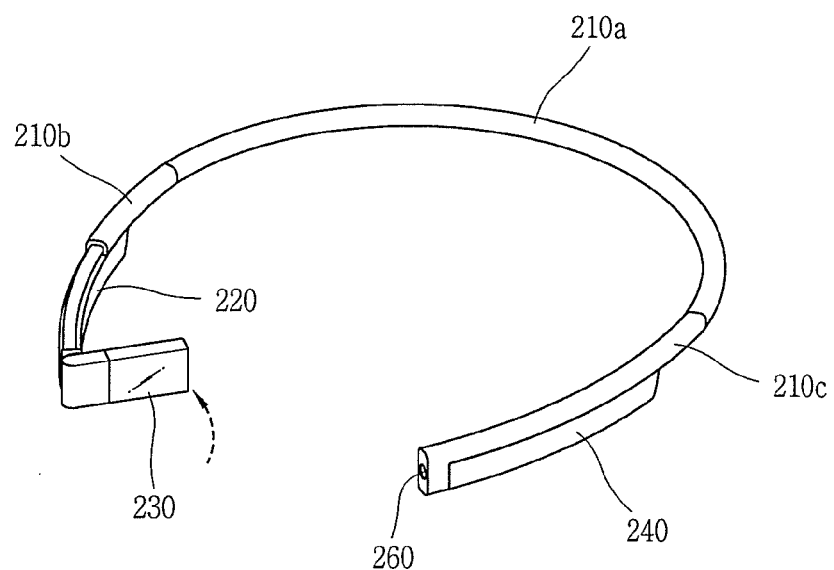
Figure 12:
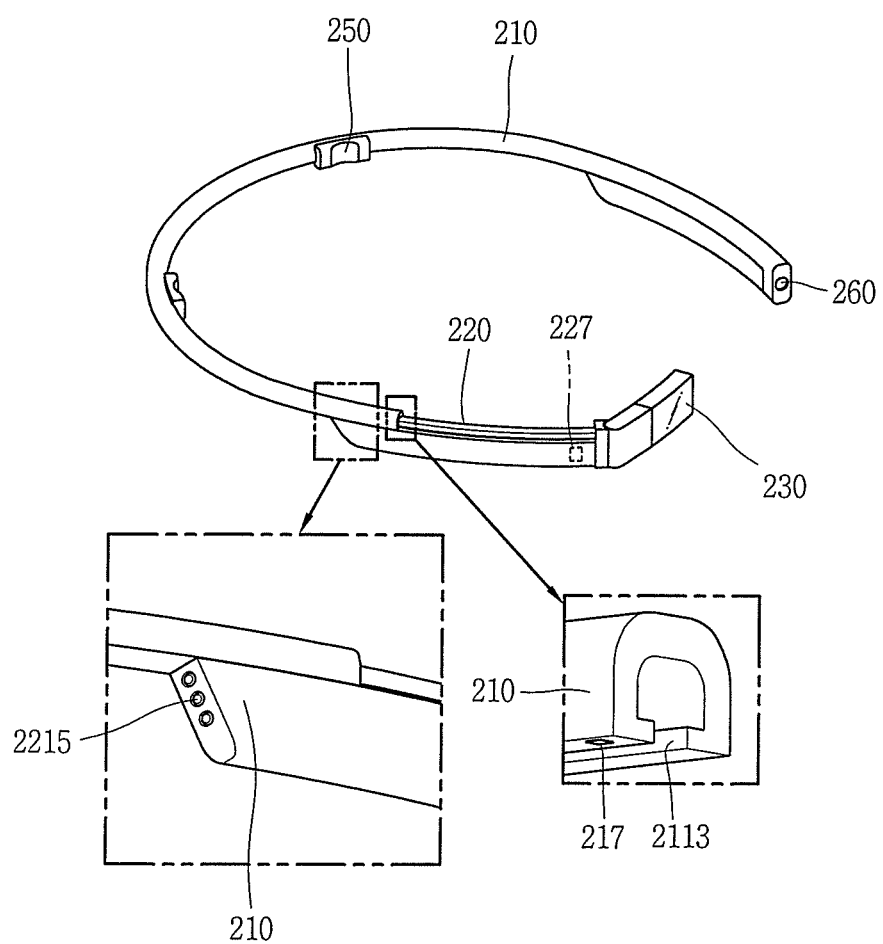
Figure 13A:
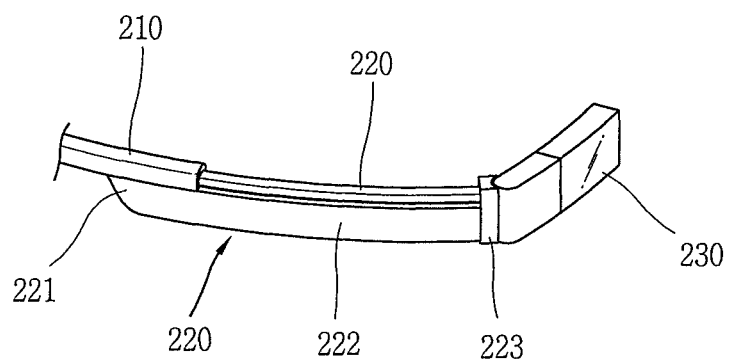
Figure 13B:
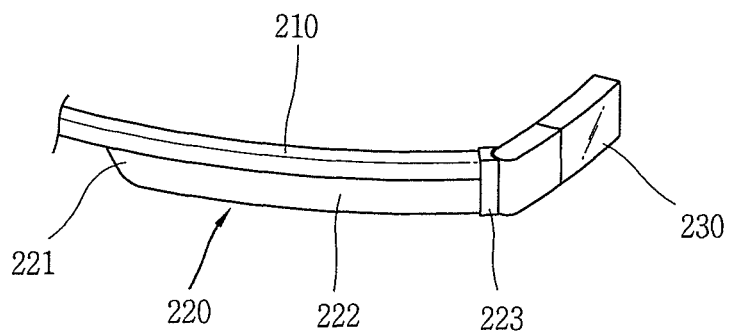
Figure 14A:
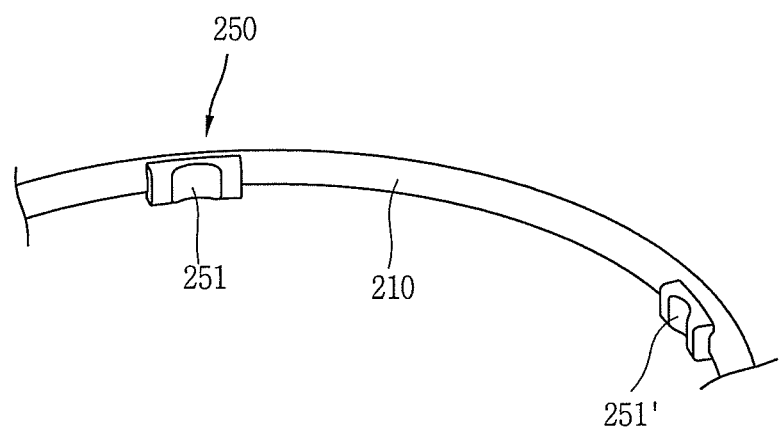
Figure 14B:
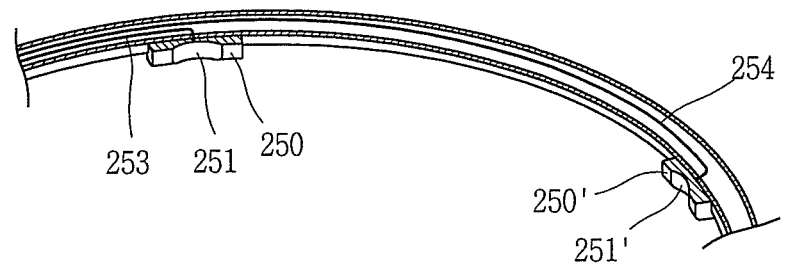
Figure 15A:
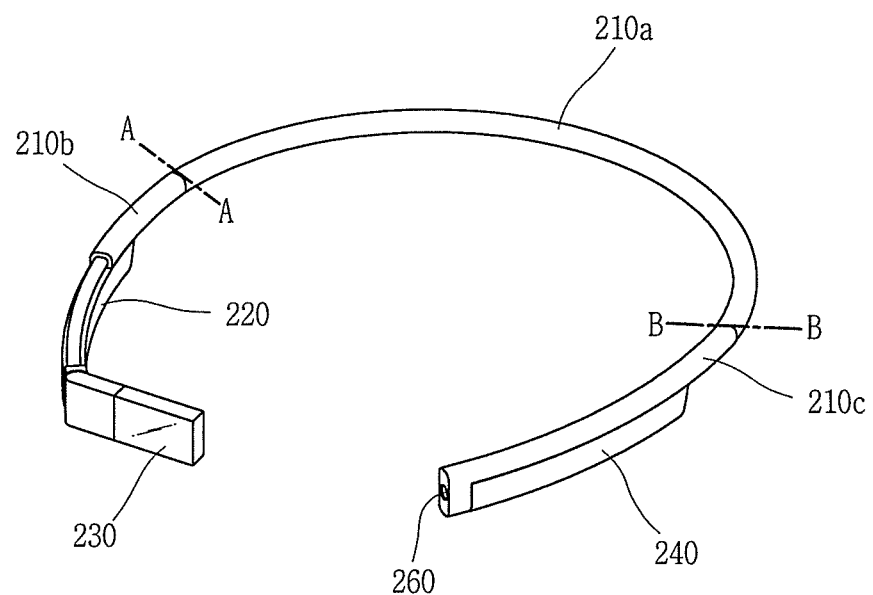
Figure 15B:
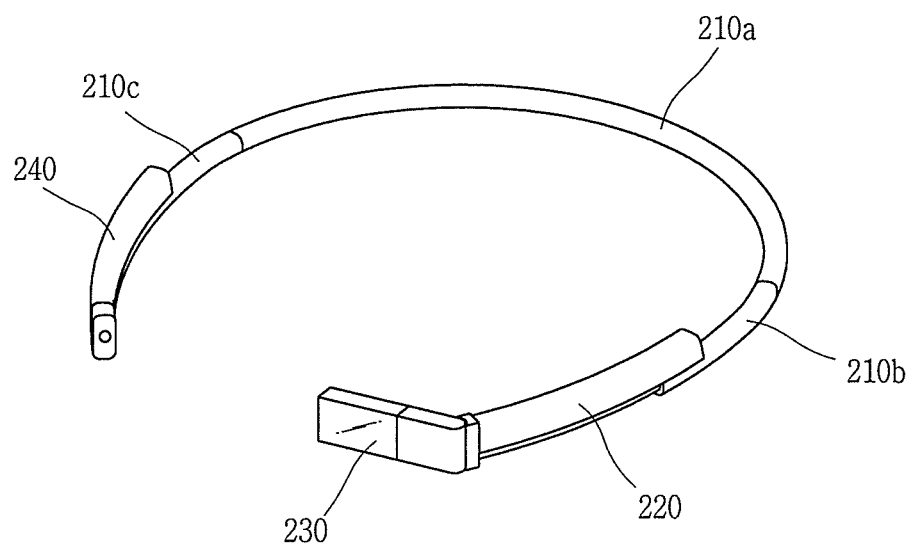
Figure 16A:
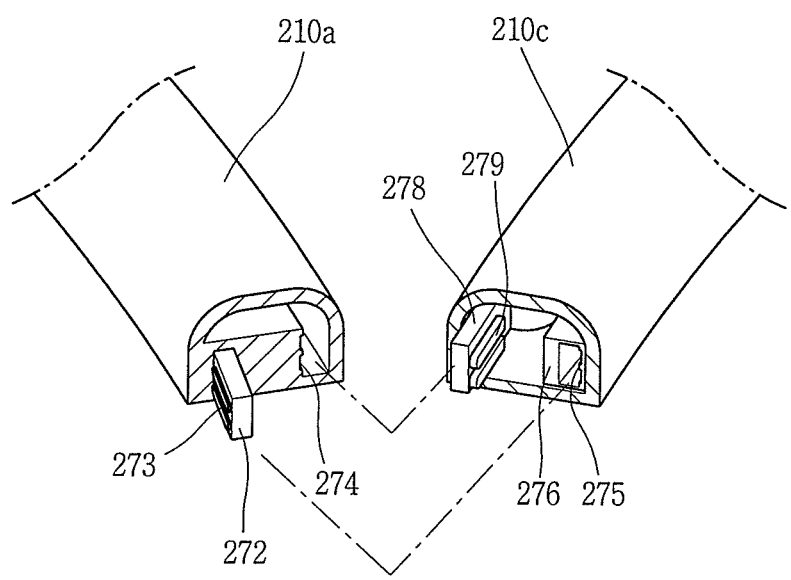
Figure 16B:
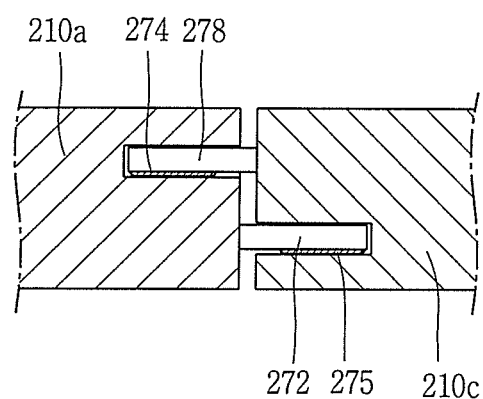

FIGS. 4, 5A, and 5B are perspective diagrams illustrating how the frame and a power supply unit according to one embodiment of the present invention are connected to each other;

FIG. 6 is a perspective diagram illustrating the inside of the frame according to one embodiment of the present invention;

FIG. 7 is a perspective diagram of a control module according to one embodiment of the present invention, when viewed from below;

FIGS. 8A to 8C are diagrams for describing how a flexible printed circuit board according to one embodiment of the present invention is folded, and extends and retracts;

FIG. 9 is a diagram for describing how the flexible printed circuit board according to one embodiment of the present invention extends and retracts;

FIG. 10 is a perspective diagram illustrating a worn state of the glasses-type terminal according to one embodiment of the present invention;

FIGS. 11A to 11C are diagrams for describing rotation of a display unit according to one embodiment of the present invention;

FIG. 12 is a diagram illustrating a charge terminal and a Hall sensor according to one embodiment of the present invention;

FIGS. 13A and 13B are diagrams for describing extension and retraction of the control module according to one embodiment of the present invention;

FIGS. 14A and 14B are perspective diagrams of a sliding prevention member and the frame including the sliding prevention member according to one embodiment of the present invention;

FIGS. 15A and 15B are diagrams for describing exchanging of positions of a power supply unit and a display unit according to one embodiment of the present invention; and FIGS. 16A and 16B are cross-sectional diagrams of the frame in a cut state, according to one embodiment of the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
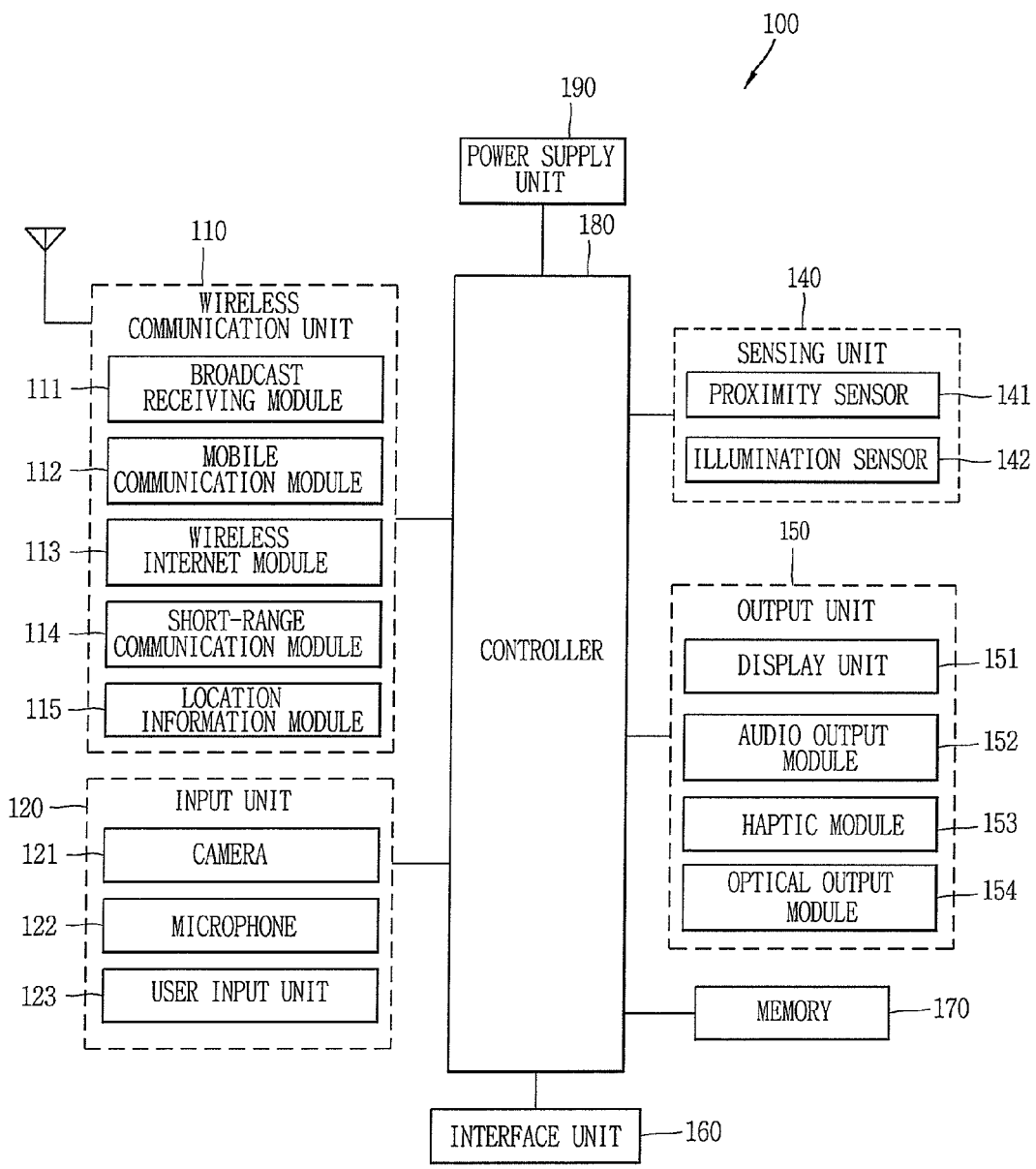

FIG. 1 is a block diagram of a glasses-type terminal 100 according to an embodiment of the present invention.

The glasses-type terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the glasses-type terminal 100 and a wireless communication system, communications between the glasses-type terminal 100 and another mobile terminal, communications between the glasses-type terminal 100 and an external server. Further, the wireless communication unit 110 typically includes one or more modules which connect the glasses-type terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glasses-type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the glasses-type terminal 100 and a user, as well as function as the user input unit 123 which provides an input interface between the glasses-type terminal 100 and the user.

The interface unit 160 serves as an interface with various types of external devices that can be coupled to the glasses-type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glasses-type terminal 100 may perform assorted control functions associated with a connected external device, in response to the external device being connected to the interface unit 160.

The memory 170 is typically implemented to store data to support various functions or features of the glasses-type terminal 100. For instance, the memory 170 may be configured to store application programs executed in the glasses-type terminal 100, data or instructions for operations of the glasses-type terminal 100, and the like. Some of these application programs may be downloaded from an external server via wireless communication. Other application programs may be installed within the glasses-type terminal 100 at time of manufacturing or shipping, which is typically the case for basic functions of the glasses-type terminal 100 (for example, receiving a call, placing a call, receiving a message, sending a message, and the like). It is common for application programs to be stored in the memory 170, installed in the glasses-type terminal 100, and executed by the controller 180 to perform an operation (or function) for the glasses-type terminal 100.

The controller 180 typically functions to control overall operation of the glasses-type terminal 100, in addition to the operations associated with the application programs. The controller 180 may provide or process information or functions appropriate for a user by processing signals, data, information and the like, which are input or output by the various components, or activating application programs stored in the memory 170.

As one example, the controller 180 controls some or all of the components so as to drive application programs that have been stored in the memory 170. For driving of the application programs, the controller 180 may operate at least two of the components included in the glasses-type terminal 100, through a combination.

The power supply unit 190 can be configured to receive external power or provide internal power in order to supply appropriate power required for operating elements and components included in the glasses-type terminal 100. The power supply unit 190 includes a battery, and the battery is configured to be built-in (mountable) or chargeable.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

A recent mobile terminal is configured as a wearable device that is wearable on a human body, beyond the conventional technique of a user grasping the mobile terminal using his or her hand. An example of such wearable device is a smart watch, a smart glass, a head mounted display (HMD), etc. Hereinafter, examples of the glasses-type terminal, implemented as such wearable device will be explained.

A wearable device may be configured to be able to exchange data with the glasses-type terminal 100 (or otherwise cooperate with the glasses-type terminal 100). The short-range communication module 114 may sense or recognize the wearable device, and permit communication between the wearable device and the glasses-type terminal 100. In addition, when the sensed wearable device is a device which is authenticated to communicate with the glasses-type terminal 100, the controller 180, for example, may cause transmission of data processed in the glasses-type terminal 100 to the wearable device via the short-range communication module 114. Hence, a user of the wearable device may use the data processed in the glasses-type terminal 100 on the wearable device. For example, when a call is received in the glasses-type terminal 100, the user may answer the call using the wearable device. Also, when a message is received in the glasses-type terminal 100, the user can check the received message using the wearable device.

Figure 2:
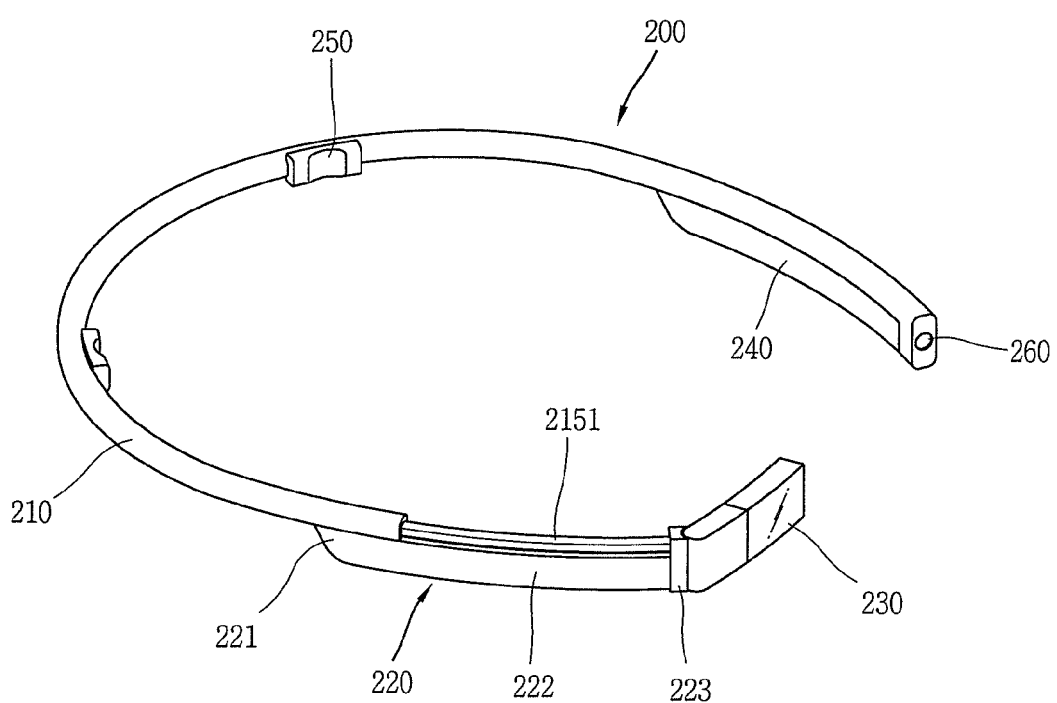

FIG. 2 is a perspective diagram illustrating one example of a glasses-type terminal 200 according to one embodiment of the present invention.

The glasses-type terminal 200 is configured to be worn on a user's head. To do this, the glasses-type terminal 200 includes a frame (a case, a housing, and the like). The frame is made of flexible material so that the glasses-type terminal 200 is easily wearable.

The frame is supported on the user's head, and has a space in which various components are mounted. As illustrated, electronic components such as a control module and a sound output module (not illustrated) are mounted on the frame. In addition, a lens is removably attached to the frame in such a manner that the lens is positioned in front of at least one of user's left and right eyes.

The control module 220 is configured in such a manner as to control various electronic components that are provided to the glasses-type mobile terminal 200. The control module 220 is understood as being configured to correspond to the controller 180 described above. The present drawings illustrate that the control module 220 is installed on a portion of the frame, which is positioned to come into contact with to one of left and right sides of the user's head. However, the control module 220 is not limited to this position.

A display unit 230 is realized in the form of an optical head-mounted display (HMD). The optical HMD uses an optical mixer and has the capability of reflecting artificial images as well as letting real images to cross a lens and let the user to look through the lens. The display unit 230 is arranged to correspond to at least one of the user's left and right eyes in such a manner that images are provided directly in front of the one of the user's left and right eyes when the glasses-type terminal 200 is worn. The present drawings illustrate that the display unit 230 is positioned to correspond to the user's right eye in order for images to be output toward the user's right eye.

The display unit 230 projects images toward the user' right eye using a prism. In addition, the prism is made of transparent material in such a manner that the user can view not only projected images, but also real scenes (that can be perceived by user's vision) that lie in a user's field of vision.

In this manner, the images that are output through the display unit 230 overlap the real scenes. The glasses-type terminal 200 provides augmented reality (AR) that superimposes virtual images onto real scenes or background images for integration into one image using these characteristics of the display unit 230.

A camera 260 is arranged adjacent to at least one of the left and right eyes in order to photograph scenes that lie in the user's field of vision. The camera 260 is positioned adjacent to the one of the left and right eyes, and thus it is possible to obtain the images of the scenes that lie in the user's field of vision.

The present drawings illustrate that the camera 260 is provided in the control module 220, but the camera 260 is not necessarily limited to this position. The camera 260 may be installed in the frame. Multiple cameras 260 may be installed and be configured to obtain stereoscopic images.

The glasses-type terminal 200 includes a user input unit (not illustrated) that is operated by the user to input a control command. Whatever type of user input unit gives a tactile feeling to the user when the user input unit is operated, such as a touch-type user input unit or a push-type user input unit, may be employed for input. The present drawings illustrate that the push-type user input unit and the touch-type user input unit are provided in the frame and the control module 220, respectively.

In addition, the glasses-type terminal 200 includes a microphone (not illustrated) into which a sound is input and which processes the sound into electric sound data, and a sound output module (not illustrated) that outputs a sound. The sound output module is configured to propagate a sound in a general sound-output manner or in a bone conduction manner. In a case where the sound output module is realized in the bone conduction manner, when the user wears the glasses-type terminal 200, the sound output module is brought into contact with the user's head, and propagates the sound by vibrating cranial bones.

According to one embodiment of the present invention, the glasses-type terminal 200 is disclosed whose one portion is moved in order for the user to conveniently carry and keep the glasses-type terminal 200. Mounted on the one portion is the display unit 151. Persons have their heads with different shape and sizes. For this reason, in a case where the length of a circular arc of the glasses-type terminal 200 is fixed, the glasses-type terminal 200 with a small-sized frame 210 does not fit a person with a large-sized head, and the glasses-type terminal 200 with a large-sized frame 210 does not fit a person with a small-sized head. Thus, it is necessary to manufacture a frame 210 that fits the shape of a user's head.

According to one embodiment of the present invention, the glasses-type terminal 200 that has a retractable structure is provided in order to solve this problem. The glasses-type terminal 200 is adjustable to fit different shapes of the users' heads, and thus the focus of images or a distance to the display unit 230 can be adjusted. In addition, a power supply unit 240 that can be removably attached is provided to increase the usage time of the glasses-type terminal 200.

The retractable structure will be described below referring to FIGS. 2, 3A and 3B. The retractable structure means one in which the frame 210 has a fixed size and a different component fastened to the frame 210 is movable from one end of the frame 210.

First, the glasses-type terminal 200 according to one embodiment of the present invention includes the frame 210 that is supported on the user's head, the power supply unit 240 that is connected to one side of the frame 210, the control module 220 that is connected to the opposite side of the frame 210 and is moved in a sliding manner in a state of being connected to the frame 210, and the display unit 230 that is provided on one end of the control module 220 and provides visual information. The frame 210 is almost in the form of an arc, and both ends of the frame 210 are separated a distance away from each other and looks forward. In this manner, portions of the frame 210 that comes into contact with a user's face (for example, a nose ridge, a forehead, and the like) is shortened as much as possible, and thus the user's field of vision can be secured.

The power supply unit 240 is in the form of a battery back. In this manner, with the power supply unit 240 in the form of a pack, which serves as an external battery, the usage time of the glasses-type terminal 200 is more lengthened. In addition, the power supply unit 240 is connected to one end portion of the frame 210, and the control module 220 and the display unit 23 is connected to the other end portion of the frame 210. This balances weights of left and right sides of the glasses-type terminal 200.

According to one embodiment of the present invention, a rail connection structure, which is provided as the retractable structure, will be described below referring to FIGS. 3A and 3B.

In the rail connection structure, a rail 215 is formed on an upper surface of the power supply unit 240 or the control module 220, and is connected to one portion of a lower surface of the frame 210, to which one of the power supply unit 240 or the control module 220 is fastened. However, according to one embodiment of the present invention, for convenience, the rail 215 is illustrated as being formed on the upper surface of the power supply unit 240, but is not necessarily limited to this position.

The control module 220 includes a main printed circuit board, a touch panel, a receiver, and the like, as illustrated in FIG. 2, is built into a frame body 211.

The rail 215 is formed to protrude from the upper surface of the control module 220, and a space into which a head 2151 of the rail 215 is inserted is formed in the one portion of the lower surface of the frame 210. At this point, a rail connection means a connection that is made in concavo-convex manner. In order to be connected to the frame 210, the rail 215 includes the head 2151 that is formed to protrude toward the frame 210, and a base 2152, or bases 2152a and 2152b. In FIG. 3A, the base 2152 extends downward from the head 2151 and then branches off into two parts that extend sideways in different directions. In FIG. 3B, the base 2152a extends downward from the head 2151 and then branches off into two parts that extend sideways in different directions. The base 2152b extends downward from the 2152a and then branches off into two parts that extend sideways in different directions. The head 2151 is formed in such a manner that the head 2151 can be accommodated in a lower portion of the frame 210. That is, the head 2151 is accommodated in the space that is formed in the frame 210. Protrusions 2113 that protrude toward each other from the lower surface of the frame 210 form an entrance to the space formed in the frame 210. At this point, protrusions 2113 prevent the protrusions 2113 from falling out of the space. That is, the base 2152 is connected to the upper surface of the control module 220 in FIG. 3A, and the bases 2152a and 2152b are connected to the upper surface of the control module 220 in FIG. 3B. At least two or more bases are connected to the upper surface of the control module 220. A fixing unit 2201 is formed to protrude from an internal lateral surface of the control module 220, the protruding fixing unit 2201 is inserted between the bases 2152a and 2152b to prevent the rail 215 from falling off.

More specifically, for example, the rail connection structure according to one embodiment of the present invention is of two types, but is not necessarily limited to this two types. Any structure in which the head 2151 is inserted into the space in the frame 210 and thus the header 2151 is connected to the control module 220 falls with the scope of claims of the present invention.

Figure 3A:
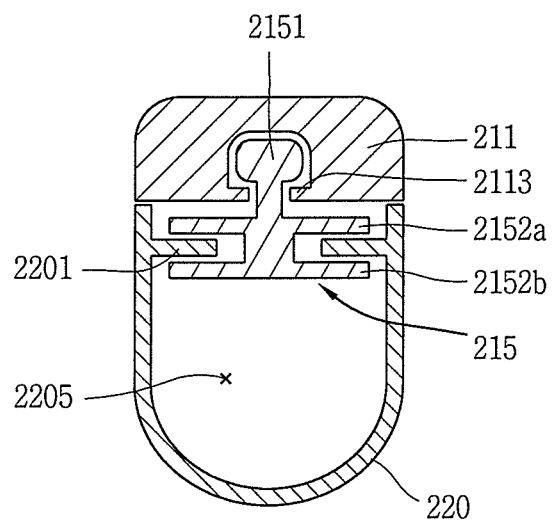
Figure 3B:
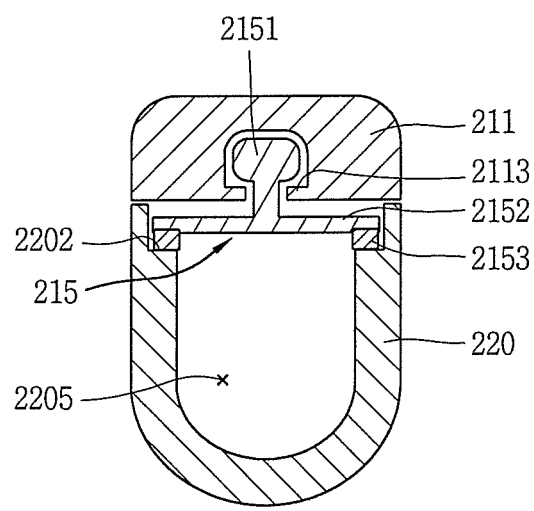

Referring to FIG. 3A, the base 2152a extends downward from the head 2151 and then branches off into two parts that extend sideways in different directions. The base 2152b extends downward from the 2152a and then branches off into two parts that extend sideways in different directions. The fixing unit 2201, which is formed to protrude from the internal lateral surface of the control module 220, is inserted between the bases 2151a and 2152b. The fixing units 2201 are formed to protrude from the opposite internal lateral surfaces, respectively, of the control module 220, and function to support the rail 215. At this point, electronic components that drives devices are arranged in a space in the control module 220. For example, a speaker or a bone conduction receiver, which is associated with audio, and a connector for connection to a separate ear microphone are arranged in the space. That is, the space is a component accommodation space 2205 in which the main printed circuit board, the touch panel, the receiver, and the like are accommodated.

Referring to, only the base 2152 is formed to extend downward from the head 2152 and then branch sideways in different directions. The base 2152 is adhesively bonded to the upper surface of the control module 220 with an adhesive 2153. To do this, a nest portion 2202 is formed by making a recess in a portion of the upper surface of the control module 220. The base 2152 is arranged in the nest portion 2202 and then is bonded to the nest portion 2202 with the adhesive 2153 in order to connect the rail 215 and the control module 220 to each other. When the rail connection structure is employed as illustrated in FIG. 3A, the two bases 2152a and 2152b are formed. Thus, the component accommodation space 2205 has an increased width, but a limited height. In contrast, when the rail connection structure is employed as illustrated in FIG. 3B, a minimum width of the nest portion 2202 has to be secured for bonding the base 2152 to the upper surface of the control module 220 with the adhesive 2153. Thus, the component accommodation space 2205 has a somewhat increased width and a somewhat increased height due to a decrease in the number of bases.

In addition, according to one embodiment of the present invention, the rail connection structure is employed when the power supply unit 240 is connected to the frame 210. Referring to FIG. 4, a rail 2104 is formed on an internal vertical surface of the frame 210. A rail connection portion 2404 is formed on one a surface of one end of the power supply unit 240 in order to be connected to the rail 2104. In addition, the power supply unit 240 is connected to the lower surface of the frame 210, the frame 210 and the power supply unit 240 is fastened to the frame 210 by the connection of the rail 2104 and the rail connection unit 2404. Hooks 241a and 241b are formed on an upper surface of the power supply unit 240, which faces the frame 210, to fasten the power supply unit 240 to the lower surface of the frame 210. The connection of the power supply unit 240 to the frame 210 is described. When the rail 2104 and the rail connection unit 2404 are connected to each other in a rail connection manner, the power supply unit 240 is brought into contact with the frame 210 and then the power supply unit 240 is forced to be pushed upward the frame 210. Thus, with the hooks 241a and 241b, the power supply unit 240 is fastened to the frame 210. Although not illustrated, grooves corresponding to the hook 241a and 241b are formed in the lower surface of the frame 210, which faces the upper surface of the power supply unit 240.

In a similar manner, the power supply unit 240 is fastened to the frame 210. There is a case where a rail 2103 for the rail connection is formed on a lower horizontal surface of the frame 210, and a rail connection portion 2403 is formed one portion of the upper surface of the power supply unit 240. Referring to FIG. 5A, when the power supply unit 240 is pushed toward the rail 2103 formed on the frame 210, with the rail connection of the rail 2103 and the rail connection portion 2403, one end portion of the power supply unit 240 is coupled to the frame 210. With a hook connection using a hook 241 formed in the upper surface of the power supply unit 240, the other end portion of the power supply unit 240 is fastened to the frame 210. Referring to FIG. 5B, when the rail 2103 and the rail connection portion 2403 are connected to each other and then the end portion of the power supply unit 240 is pushed upward, the power supply unit 240 is fastened to the frame 210.

The rails 2103 and 2104 and the rail connection portions 2403 and 2404 are described above as being formed on the frame 210 and on the power supply unit 240, respectively, but are not limited to this positions. The rails 2103 and 2104 may be formed on the power supply unit 240 and the rail connection portion 2403 and 2404 may be formed on the frame 210. This is true for the hook 241 and the hooks 241a and 241b. It is apparent that the hook 241 and the hooks 241a and 241b are formed on the frame 210 and that the grooves into which the hook 241 and the hooks 241a and 241b are inserted are formed in the power supply unit 240. The connection using the hook 241 and the hooks 241a and 241b is described above as one example, but the fastening of the power supply unit 240 to the frame 210 is not limited to this. Any method of fastening the power supply unit 240 to the frame 210 can be employed. For example, a magnet 217 may be arranged within the frame 310 and the power supply unit 240. Thus, with attraction between the magnets 317, the power supply unit 240 is fastened to the frame 210.

In this manner, the structure is employed in which the rails 2103 and 2104 for the rail connection are formed on the lower horizontal surface or an internal vertical surface of the frame 210. The rail connection portions 2403 and 2404 corresponding to the rails 2103 and 2104, respectively, are formed on the power supply unit 240. In addition, the power supply unit 240 is removably attached in a sliding manner and thus a replacement battery can be used. A high-capacity battery can be instead used to increase the usage time.

In addition, in order to electrically connect the power supply unit 240 to the frame 210, a charge pint 213 protrudes from the frame, and a pin hole 243 is formed in the upper surface of the power supply unit 240. The charge pin 213 is inserted into the pin hole 243.

On the other hand, as illustrated in FIG. 6, a flexible printed circuit board 270 is formed in a vertical position within the frame 210. According to one embodiment of the present invention, because the glasses-type mobile terminal 200 has the retractable structure, there is a problem with arrangement of the flexible printed circuit board (FPCB) 270. According to one embodiment of the present invention, this characteristic of the flexible printed circuit board 270 is used for movement of the control module 220. That is, normally, the flexible printed circuit board 270 is formed in the vertical position within the frame 210. This is done in order for the flexible printed circuit board 270 to be naturally folded when the frame 210 is folded. However, in order to move the control module 220, a space in which the flexible printed circuit board 270 is folded is necessary. According to one embodiment of the present invention, a fold space portion 221 is provided on one side of the power supply unit 240.

That is, the flexible printed circuit board 270 is provided within the frame 210, and the fold space portion 221 is provided in which the flexible printed circuit board 270 is mounted when the control module 220 moves. The fold space portion 221 is formed on an end of the control module 220. The flexible printed circuit board 270 is formed in the vertical direction within the frame 210 and is arranged in a horizontal position adjacent to the fold space portion 221. FIG. 8A illustrates that the flexible printed circuit board 270 that is formed in the vertical direction is folded in the horizontal position with one portion being placed on top of another. This folding phenomenon occurs adjacent to the fold space portion 221, and is desirable that the folding phenomenon occurs before the flexible printed circuit board is introduced into the control module 220. FIG. 8B illustrates a state where the glasses-type terminal 200 extends. FIG. 8C illustrates that the glasses-type terminal 200 retracts. These states are the same as those illustrated in FIGS. 13A and 13B. As illustrated in FIGS. 8B and 8C, the flexible printed circuit board 270 is introduced into the control module 220 through openings 219a and 219b that are formed in the frame 210 and the control module 220, respectively, and then retracts. At this point, the openings 219a and 219b are controlled by the rail 215 in such a manner that the openings 219a and 219b are not exposed to the outside. It is desirable that the flexible printed circuit board 270 is not exposed to the outside through the opening 219a that is formed in the lower surface of the frame 210.

On the other hand, FIG. 7 is a perspective diagram of the control module according to one embodiment of the present invention, when viewed from below. A microphone hole 222 and an earphone jack hole 225 are formed in the lower surface of the control module 220. FIG. 8 illustrates that the flexible printed circuit board 270 that is formed in the vertical position is folded several times still in a vertical position with one portion being places on top of another. Referring to FIG. 9, the flexible printed circuit board is in the vertical direction within the frame 210 and is formed in an almost vertical position while the flexible printed circuit board passes through the openings 219a and the 219b that are formed in the frame 210 and the control module 220, respectively, leading to the control module 220. In this manner, with the movement of the control module 220 in a sliding manner, the flexible printed circuit board 270 introduced into the control module 220 is folded in the vertical direction with one portion being placed on top of another. At this point, as illustrated in FIGS. 8A to 8C, it is desirable that the flexible printed circuit board 270 is not exposed to the outside through the openings 219a and 219b.

In this manner, the flexible printed circuit board 270 may be folded in a vertical direction, and after being changed to a horizontal position, may be folded several times with one portion being placed on top of another.

FIG. 10 is a perspective diagram illustrating a state where the glasses-type terminal according to one embodiment of the present invention is worn. As illustrated in FIG. 10, the control module 220 is supported on user's ears. Although not illustrated, the power supply unit 240 also is supported on the user's ears. As illustrated in FIG. 10, the display unit 230 is positioned near the user's eye by extending or retracting the glasses-type terminal according to a size of the user's head H.

In addition, according to one embodiment of the present invention, sliding prevention members 250 are provided on an inner circumferential surface of the frame 210. The sliding prevention members 250 in a pair are positioned a distance from each other. Electrodes 251 and 251' are formed on the sliding prevention members 250, respectively, in such a manner that the user's head is recognized. The electrodes 251 and 251' are formed in such a manner that they face each other. The sliding prevention member 250, which is made of elastic material such as rubber, helps hold the glasses-type terminal the frame 210 tightly against the user's head and prevents the glasses-type terminal from slipping off.

The pair of sliding prevention members 250 is described as being provided, but the number of sliding prevention members 250 is not limited to 2. One or more sliding prevention members 250 may be provided whenever necessary.

However, the electrodes are configured to include a transmitter electrode 251 and a receiver electrode 251'. While, in a case where there is no object between the transmitter electrode 251 and the receiver electrode 251', an electrical signal is not transmitted from the transmitter electrode 251 to the receiver electrode 251', in a case where there is a human body between the transmitter electrode 251 and the receiver electrode 251', the electrical signal is transmitted from the from the transmitter electrode 251 through the human body to the receiver electrode 251'. The human body serves as a dielectric material.

It is detected whether or not the glasses-type terminal is worn, using this phenomenon. The glasses-type terminal may be controlled in such a manner that the glasses-type terminal is powered on or powered off depending on whether or not the glasses-type terminal is worn. FIG. 14A illustrates that the pair of electrodes is arranged on the frame 210. FIG. 14B is a perspective horizontally cross-sectional diagram of the frame 210 in FIG. 14A. Referring to FIG. 14B, a terminal connection line 253 that is connected to the transmitter electrode 251, and a terminal connection line 254 that is connected to the receiver electrode 251' are provided within the frame 210.

FIG. 12 illustrates charge terminals 2215 and a hall sensor 227 according to one embodiment of the present invention. According to one embodiment of the present invention, power is supplied by the power supply unit 240, but the power may be supplied to the glasses-type terminal 200 using the charge terminals 2215. At this point, the charge terminals 2215 are formed on a surface of one end of the control module 220.

In addition, according to one embodiment of the present invention, the glasses-type terminal 200 may be automatically powered on or powered off according to the detection of whether or not the control module 220 is moved. To do this, the magnet 217 is provided on the lower surface of the frame 210, and a hall sensor (Hall IC) 227 is provided on a front end portion of the control module 220. When the frame 210 and the Hall sensor 227 approach each other, this is recognized as the user's intention to use the glasses-type terminal 200, and thus the glasses-type terminal 200 is automatically powered on. In addition, the frame 210 and the control module 220 are moved away from each other, this is recognized as the user's intention to stop using the glasses-type terminal 200, and thus the glasses-type terminal 200 is automatically powered off. FIG. 12 illustrates that the magnet 217 is arranged on a lower surface of an end portion of the frame 210, but the magnet 217 is not necessarily limited to this position. The magnet 217 may be arranged within the frame 210.

However, in such a case, it is difficult to precisely determine what is the user's intention. Thus, it is desirable that the user is asked whether he/she intends to power on or to power off the glasses-type mobile terminal. Then, the glasses-type mobile terminal is accordingly powered on or powered off.

On the other hand, according to one embodiment of the present invention, the display unit 230 is rotated. To do this, a hinge structure is employed. FIGS. 11A to 11C are diagrams for describing the rotation of the display unit 230 according to one embodiment of the present invention. Referring to FIGS. 11A to 11C, a hinge portion 223 and a circuit drive unit 235 are arranged between the control module 220 and the display unit 230. The hinge portion 223 is electrically connected to the control module 220, and the circuit drive unit 235 is electrically connected to the display unit 230. A hinge shaft 224 is provided on the hinge portion 223 and an extension portion in such a manner that the rotation about the hinge shaft 224 is possible. With this hinge structure, the display unit 230 rotates inward and outward about the hinge shaft 223. Although not illustrated, the display unit 230 includes an optical lens and a display. As the display, a micro flat display, such as an LCD or an OLED, is arranged. As the display, A transparent OLED may be employed for transparency. An optical lens part is provided to determine a viewing angle and a focal distance. As the optical lens, a general lens or an array lens is used according to application. Then, a circuit device and a driver for driving the display unit 230 is arranged in the circuit drive unit 235.

Such a structure is advantageous in terms of slimming the display unit 230.

As illustrated in FIG. 11C, the hinge shaft 224 that connects the display unit 230 to the control module 220 is provided on one end of the control module 220. This makes it convenient to carry and keep the glass-type mobile terminal 200.

The display unit 230 is installed to be positioned in front of the user's right eye as illustrated in FIG. 10, but in some cases, a position of the display unit 230 is changed. To do this, according to one embodiment of the present invention, the frame 210 includes a first portion 210a, a second portion 210b, and a third portion 210c. The first portion 210a comes into contact with a rear side of the user's head. The second portion 210b is connected to the first portion 210a, and the control module 220 is coupled to the second portion 210b. The power supply unit 240 is coupled to the third portion 210c. The first portion 210a and the second portion 210b are separated from each other, and the first portion 210a and the second portion 210b are separated from each other. Thus, the second portion 210b and the third portion 210 are exchangeable with each other. Line AA and line BB in FIG. 15A indicate a border between the first portion 210a and the second portion 210b and a border between the first portion 210a and the third portion 210c, respectively.

In this manner, a position of the second portion 210b and a position of the third portion 210c may be exchanged with each other in terms of position, and a position of the display unit 230 may be changed. However, the frame 210 is formed to have a given radius of curvature. In order to maintain the given radius of curvature, the power supply unit 240 and the control module 220 are formed on an upper surface of the frame 210 as illustrated in FIG. 15B.

More specifically, as illustrated in FIGS. 6A and 6B, the first portion 210a is connected to the second portion 210b and the third portion 210c with connectors 272 and 278, and a socket 276, respectively.

For example, the socket 276 is included within the third portion 210c, and the first portion 210a includes the connector 272 that is exposed to the outside. The connector 272 is inserted into the socket 276, and thus the first portion 201a and the third portion 210c are connected to each other. In a similar manner, with the connection of the connectors 272 and 278 and the socket 276, the first portion 210a and the second portion 210b are connected to each other. In addition, as illustrated in FIG. 16A, regardless of a shape of the socket 276 into which the connectors 272 and 278 are inserted, only contact pads 274 and 275 may be formed for arrangement.

That is, in order for the flexible printed circuit board 270 to maintain electrical connection, the contact pads 274 and the 275 have to be connected to the connector 278 and 272, respectively. For this purpose, the socket 276 is used and thus the socket 276 is not limited to a particular shape. Any socket may be structurally possible in which the contact pads 274 and 275 are arranged and into which the connector 272 and 278 are inserted for fixation. In addition, formation positions of the connectors 272 and 278 and a formation position of the socket 276 are exchanged with each other. According to one embodiment of the present invention, two connection structures are employed in which the connectors 272 and 278 are separately connected to the socket 276. This provides more solid connections between the connectors 272 and 278 and the socket 276. That is, as illustrated in FIG. 16B, the connector 272 and the contact pad 274 are provided on the first portion 210a, and the connector 278 and the contact pad 274 are provided on the third portion 210c. Thus, two connections are made between the first portions 210 and the third portion 210c. On the other hand, a camera 260 is provided on one end of the third portion 210c.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A glasses-type terminal comprising:
a frame having a first end and a second end separated from the first end to provide a cut-out portion, the frame to be provided on a user's head;
a power supply device to couple to the first end of the frame;
a control device to couple to the second end of the frame, and the control device having a plurality of electronic components for operation of the glasses-type terminal;
a display device, at the control device, to provide visual information; and
a rail at a surface of the control device, and wherein the rail is to couple to a surface of the frame in a concavo-convex manner such that the control device is to slidably move on the frame,
wherein the rail includes:
a head to protrude to the frame, and the head to be provided in a space of the frame; and
a base to couple to a surface of the control device,
wherein protrusions protrude toward each other to form an entrance to the space of the frame,
wherein a hook is at a surface of the power supply device, the surface facing the frame, and
wherein the hook to couple the power supply device to the frame.

2. The glasses-type terminal of claim 1, wherein the power supply device is to couple to the frame in a rail connection manner.

3. The glasses-type terminal of claim 2, wherein the rail is at a lower surface or an internal surface of the frame, and wherein the power supply device has a rail connection structure corresponding to the rail.

4. The glasses-type terminal of claim 1, wherein the bases includes at least two bases, and
wherein a fixing unit is to protrude from a surface of the control device, and is to be provided between the at least two bases.

5. The glasses-type terminal of claim 1, wherein sliding prevention members are provided at a surface of the frame.

6. The glasses-type terminal of claim 5, wherein the sliding prevention members include a first sliding prevention member and a second sliding prevention member, and wherein electrodes are at the first and second sliding prevention members to determine information relating to a user's head.

7. The glasses-type terminal of claim 1, wherein a magnet is provided at a surface of the frame, and
wherein a Hall sensor is at a front portion of the control device.

8. The glasses-type terminal of claim 1, wherein a hinge portion and a circuit drive device are between the control device and the display device, and
wherein the hinge portion is coupled to the circuit drive device by a hinge device.

9. The glasses-type terminal of claim 1, further comprising a flexible circuit board within the frame, and a fold space portion is to receive the flexible circuit board when the control device moves in a sliding manner.

10. The glasses-type terminal of claim 9, wherein the flexible circuit board is in a vertical direction within the frame, and the flexible circuit board is provided in a horizontal direction near the fold space portion, and
wherein the flexible circuit board is folded at least once in the fold space portion.

11. The glasses-type terminal of claim 9, wherein the flexible circuit board is in a vertical direction within the frame, and the flexible circuit board is folded at least once in a vertical position in the fold space portion.

12. A glasses-type terminal comprising:
a frame having a first end and a second end separated from the first end to provide a cut-out portion, the frame to be provided on a user's head,
a power supply device to couple to the first end of the frame,
a control device to couple to the second end of the frame, and the control device having a plurality of electronic components for operation of the glasses-type terminal;
a display device, at the control device, to provide visual information; and
a rail at a surface of the control device, and wherein the rail is to couple to a surface of the frame in a concavo-convex manner such that the control device is to slidably move on the frame,
wherein the frame includes:
a first portion to contact the user's head;
a second portion to couple to the first portion, and the control device to couple to the second portion; and
a third portion to couple to the first portion, and the power supply device to couple to the third portion,
wherein the second portion is separated from the first portion, and the third portion is separated from the first portion, and
wherein the second portion is exchangeable with the third portion.

13. The glasses-type terminal of claim 12, wherein the first portion of the frame is to couple to the second portion and the third portion by a connector and a socket.

14. The glasses-type terminal of claim 13, wherein the socket is inward provided at a first side of the first portion, and the connector is outward provided at a second side of the first portion, and
wherein a connector is provided at the second portion and the third portion to correspond to the socket at the first portion, and a socket is provided at the second portion and the third portion to correspond to the connector at the first portion.

15. The glasses-type terminal of claim 13, further comprising a camera at an end of the third portion.

* * * * *